H. S. COBB.
PICTURE FRAME.
APPLICATION FILED FEB. 20, 1917.

1,253,152.

Patented Jan. 8, 1918.

WITNESSES

INVENTOR
H. S. Cobb
BY Victor J. Evans
ATTORNEY

UNITED STATES PATENT OFFICE.

HYMAN S. COBB, OF BIRMINGHAM, ALABAMA.

PICTURE-FRAME.

1,253,152.  Specification of Letters Patent.  Patented Jan. 8, 1918.

Application filed February 20, 1917. Serial No. 149,865.

*To all whom it may concern:*

Be it known that I, HYMAN S. COBB, a citizen of the United States, residing at Birmingham, in the county of Jefferson and State of Alabama, have invented new and useful Improvements in Picture-Frames, of which the following is a specification.

This invention relates to fine arts and has particular reference to picture frames and photographic mounts, and comprehends the production of an article which is exceedingly artistic and pleasing to the eye.

This invention also embodies a new method of producing an ornamental surface, which is particularly useful as a photographic mount and very artistic in design.

The nature and advantages of the invention will be more apparent from the following detail description when taken in connection with the accompanying drawing, the invention residing within the scope of what is claimed.

In the drawing forming part of this application like numerals of reference indicate similar parts in the several views and wherein:—

Figure 1:
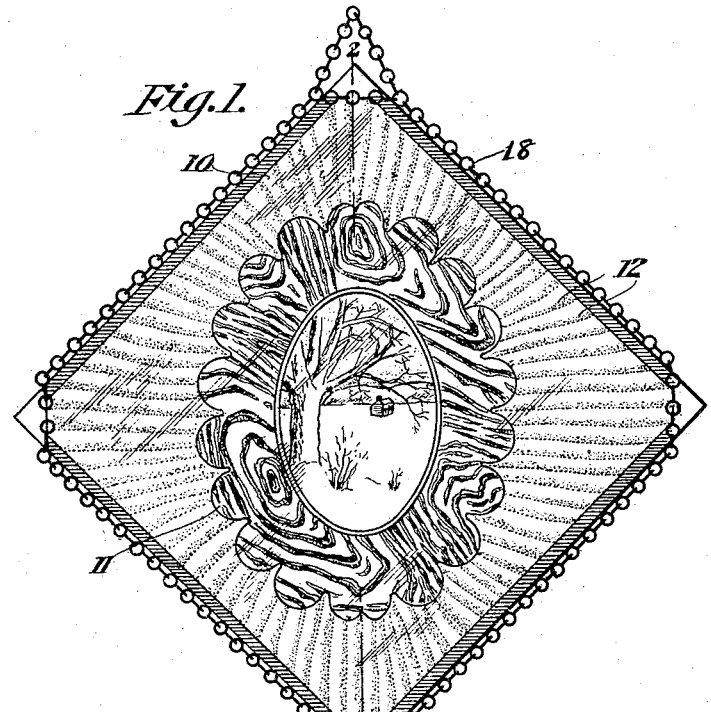
Figure 1 is a front elevation.
Figure 3:
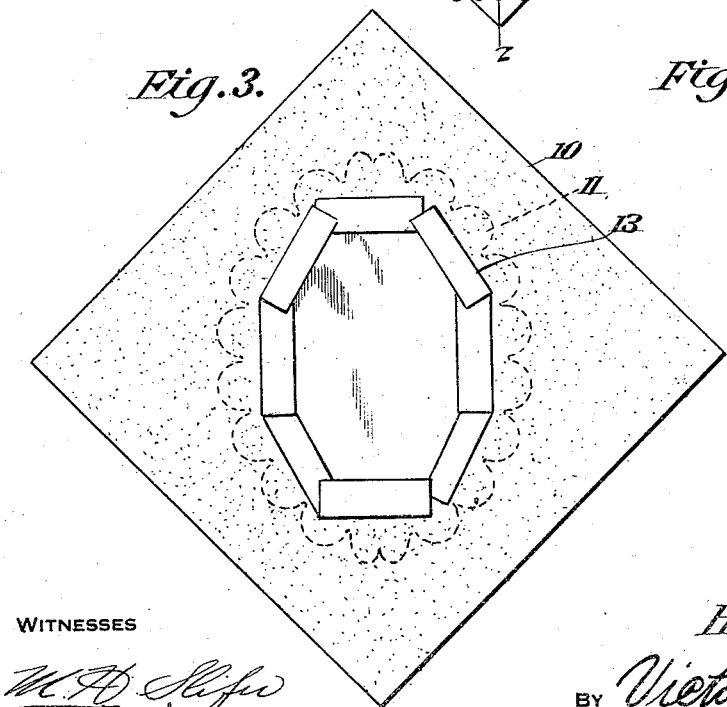
Figure 2:
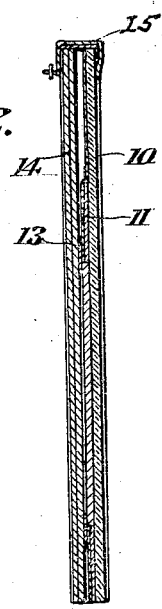
Fig. 2 is a sectional view taken on line 2—2 of Fig. 1.

Fig. 3 is a rear elevation of the transparent mounting.

In carrying out the invention I preferably make use of a transparent mounting, indicated at 10 upon the rear side of which the photograph is arranged. Prior to the association of these elements, a piece of wood-paper of any suitable outline or design indicated at 11 is used for a background, and secured to the rear side of the transparent element 10 in any suitable manner, preferably by means of a transparent adhesive substance. The transparent element is then thoroughly cleansed, and a high grade of bronzing powder and liquid is applied to the rear side of the transparent element in a manner to produce lines or creases 12 which appear on the opposite or front side of the transparent element, the creases radiating from the edges of the wood-paper or background to the edges of the transparent element. The photograph is then placed upon the wood-paper, and the latter is marked and subsequently cut along a prescribed line in accordance with the outline and size of the photograph, to provide an opening in the wood paper for the reception of the picture or photograph which is arranged in face contact with the transparent element. The picture is secured in this position in any suitable manner, preferably by adhesive strips of material indicated at 13 which is arranged about the marginal edge of the picture or photograph. One or more pieces of cardboard or other suitable material 14, of an area equal to that of the transparent element 10 is arranged at the back of the latter, and these parts are effectively secured together by means of a suitable binding 15.

As above stated the invention embodies an improved method of producing an ornamental surface of the design illustrated, wherein the transparent element is treated from one side to produce radiating lines or creases visible from the opposite side of the element, and in carrying the principle into effect, a good quality of liquid, such as bronze or the like is applied to one face of the transparent element by means of a brush of any suitable character. A brush having a chisel-like edge, of a very stiff quality is most suitable for the purpose, and the liquid substance applied by having each stroke of the brush lapped over the one just made, and in this manner the radiating lines or creases are produced to show on the opposite side or face of the transparent element. The bronze and wood-paper not only provide an ornamental surface which is pleasing to the eye, but the radiating lines or creases materially adds to the artisticness of the production as a whole.

It will be manifest that there is nothing put on the face of the picture, so that in event the transparent element is broken the picture would not necessarily be damaged, and should it be desired to remove the photograph for any purpose, as for instance to substitute another photograph, this can be quickly and easily accomplished, by splitting the binding 15 on three sides, should the transparent element be of rectangular outline as shown in this specific instance, and placing a damp cloth over the picture for a short time. The adhesive strips holding the photograph in place can then be readily removed, and the photograph separated from the transparent element.

While the picture may be hung upon a wall or other support in any suitable manner, I make use of a chain indicated at 18, which is arranged about the edges in the manner shown, the chain being constructed to receive the corners whereby the picture in its entirety may be securely hung upon the wall.

It will be clear from the foregoing description when taken in connection with the drawing that I have provided a very artistic and ornamental picture frame or mounting, and in addition to being meritorious from this view point, it is also dust-proof, the photograph being protected from dust and foreign matter and consequently remains bright and clear.

While I have shown and described what I consider the preferred embodiment of the invention, I desire to have it understood that the disclosure is not to be considered restrictive in any respects, and that such changes may be resorted to when desired as fall within the scope of what is claimed.

What is claimed is:—

1. A method of treating a transparent member to produce an ornamental design, consisting of painting one side of the member with an ornamental substance, in a manner to provide lines or creases visible from the opposite side of the member.

2. The method of treating a transparent member to produce an ornamental design consisting of painting one side of the member with an ornamental substance, having each stroke overlapping the previous stroke to produce lines or creases visible from the opposite side.

3. The method of treating a transparent member to produce an ornamental design, consisting of securing to the member at one side thereof a piece of material of artistic appearance, and painting the member about said material with an ornamental substance in a manner to produce lines or creases visible from the opposite side of the member.

4. A method of treating a transparent member to produce an ornamental design, consisting of securing to one side of the member by means of a transparent adhesive, a piece of material of artistic appearance, and arranging the material substantially central of said member, and finally painting said transparent member around the center piece, with each stroke overlapping the previously made stroke to provide lines or creases visible from the opposite side of the member.

5. An article of the character described embodying a transparent photograph mount, a member of ornamental design secured to one side of the mount and constituting a background for the photograph, said mount being treated on the side to which the design is secured, to provide lines or crease visible from the opposite side of the mount, said lines or creases radiating from the edge of said design, a backing for the transparent mount, and means for securing said parts together.

6. An article of the character described embodying a transparent photograph mount, having substantially parallel lines or creases on one side radiating from a point approximately central of the mount to the edges thereof and visible from the opposite side of the mount, a member of ornamental design adapted to be secured to one side of the mount inwardly of the adjacent extremities of said lines or creases, said member constituting a background for the photograph, a backing for said transparent mount, and means for securing said parts together.

In testimony whereof I affix my signature.

HYMAN S. COBB.

Copies of this patent may be obtained for five cents each, by addressing the "Commissioner of Patents, Washington, D. C."